FIP8212 OR 3,093,477

June 11, 1963 S. TRIEBWASSER 3,093,477

ELECTRO-OPTICAL BISTABLE LIGHT SWITCH

Filed Dec. 31, 1959

INVENTOR
SOL TRIEBWASSER
BY John E. Daugherty Jr.
ATTORNEY 3,093,477

ELECTRO-OPTICAL BISTABLE LIGHT SWITCH

Sol Triebwasser, Peekskill, N.Y., assignor to International Business Machines Corporation, New York, N.Y., a corporation of New York Filed Dec. 31, 1959, Ser. No. 863,360
8 Claims. (Cl. 88—61)

The present invention relates to electro-optics and, more particularly, to electro-optical devices capable of sustaining themselves stably in different conditions of both continuous and intermittent operations.

The electro-optical devices known in the art are confined, in the main, to applications requiring the switching or modulation of light. These devices usually include a light switching or modulating element to which electrical signals are applied to control or modulate the transmission of light through the switch. Various type output devices, which may be in the form of light sensitive film or paper, or a light sensitive electrical circuit, are arranged to receive and respond to the light output of the light switch. These devices are dependent for their operation, on the continuous application of externally derived input control signals applied to the light switches themselves and are not capable of maintaining themselves stably in different operating conditions or of being selectively switched between different stable operating conditions by the application of the discrete electrical signals.

In accordance with the principles of the present invention, electro-optical devices are provided which have the ablity of sustaining themselves stably in different operating conditions, both continuous and intermittent, and of being selectively switched back and forth between these operating conditions in response to discrete electrical signals. One embodiment of the invention disclosed herein is a bistable electro-optical device capable of sustaining itself continuously in either an on or an off operating condition. The device includes a light switch and a light responsive circuit. The transmission of light through the light switch is controlled by electrical signals applied to the switch and the light responsive circuit is mounted to receive as an input the light output of the light switch. This light responsive circuit responds to these inputs by producing electrical signal outputs which are transmitted back to the input of the light switch and are applied as inputs to the light switch. Depending upon the magnitude of the originally applied input signals to the light switch, the device is capable of producing output electrical signals at the ouput of light responsive circuit which are either greater than or less than the input signals. The device, therefore, exhibits a threshold so that, when an input signal having a magnitude greater than the threshold magnitude is applied, the switch is turned on, but when the magnitude of the input signal is less than this threshold, the switch is turned off. Once turned on or off, the switch sustains itself stably in either condition.

Another embodiment of the invention herein disclosed is in the form of a light delay line. This delay line is similar in structure to the bistable device described above, differing only in that a light delay path is provided between the output of the light switch and the input of the light responsive circuit. The electrical input signals applied to the input of the light switch have a duration which is appreciably less than the time required for a light pulse to travel this delay path and, therefore, the delay line is capable of sustaining a number of circulating light pulses at one time.

In the embodiments herein disclosed as illustrating applicant's invention, the light switch is formed of a crystal of barium titanate maintained above its Curie temperature and mounted between a pair of cross polarizers. This type of light switch depends for its operation upon the controllable birefringent properties of the barium titanate crystal and is described in detail in copending application ~~Serial~~ No. 645,995, filed March 14, 1957, in behalf of A. C. Koelsch et al., now U.S. Patent No. 3,027,806, and is advantageous in that it is operable at extremely high speeds in response to relatively small voltage signals. Further, the voltage input-light output characteristic curve of this type of light switch is ideally suited to applicant's device and may be readily combined with a light responsive circuit having characteristics such that the stable points of operation are precisely defined and a definite threshold is obtained.

It is, therefore, an object of applicant's invention to provide improved electro-optical devices.

It is a more specific object to provide an electro-optical device capable of sustaining itself stably in different operating conditions.

Another object is to provide electro-optical devices capable of themselves storing information and usable in information and data handling systems.

Another object is to provide a bistable electro-optical device.

A further object is to provide an electro-optical delay line.

The foregoing and other objects, features and advantages of the invention will be apparent from the following more particular description of preferred embodiments of the invention, as illustrated in the accompanying drawings.

Figures 1, 2:
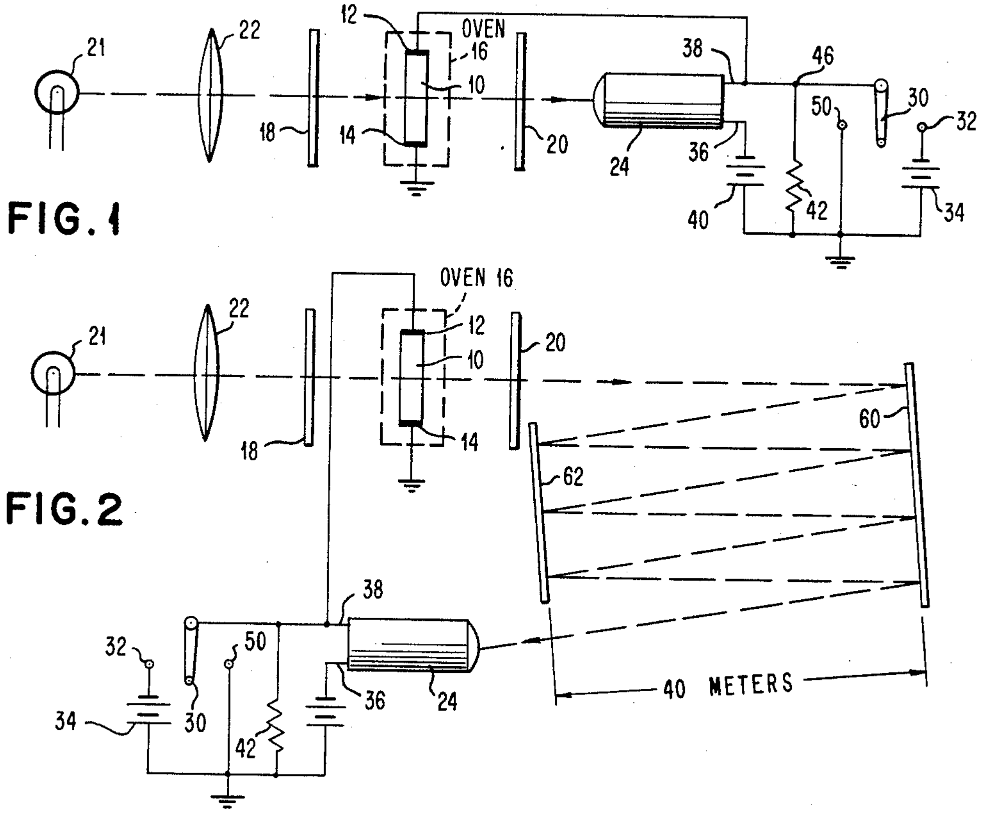
FIG. 1 is a diagrammatic representation of a bistable barium titanate light switch.
FIG. 2 is a diagrammatic representation of an electro-optical delay line.

The actual light switching in the bistable device shown in FIG. 1 is accomplished by a light switch of the type which is shown and described in detail in the above cited copending application Serial No. 645,995, filed March 14, 1957, in behalf of A. C. Koelsch et al. The light modulating element of the switch is a crystal of barium titanate 10 on which a pair of electrodes 12 and 14 are mounted. The crystal is placed within an oven 16 which maintains it at a temperature above 120° C., which is the Curie temperature for the crystal. At this elevated temperature, the barium titanate crystal is birefringent only when subjected to an electric field. The crystal 10 is mounted between a pair of cross polarizers 18 and 20, that is, these polarizers have their angles of acceptance at right angles to each other.

Light is supplied to the light switch of FIG. 1 by a mercury arc lamp 21. The light from this lamp passes through a focusing lens 22 and is applied to the first polarizer 18. After passing through this polarizer, the light is plane polarized and this plane polarized light is incident on the barium titanate crystal 10. When there is no electric field applied to this crystal, the plane polarized light passes through the crystal undisturbed and is incident on the second of the cross polarizers 20. Since the angle of acceptance of the polarizer 18 is at right angles to the angle of acceptance of the polarizer 20, the plane polarized light incident on the latter polarizer is totally absorbed and no light passes through this polarizer to a photomultiplier 24, which forms part of the light responsive circuit of applicant's bistable device. When, however, a voltage is applied to the electrodes 12 and 14 to subject crystal 10 to an electric field, the plane polarized light incident on this crystal has its polarization changed as it passes through the crystal and emerges elliptically polarized. This elliptically polarized light includes a component parallel to the angle of acceptance of the polarizer 20 and this portion of the light incident on this polarizer is passed through the polarizer to the photomultiplier 24.

Figure 3:
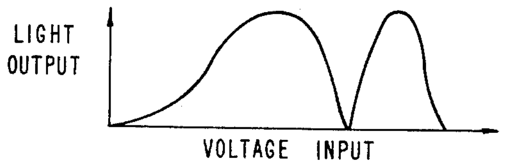
FIG. 3 shows the voltage input-light output characteristic for the light switch used in the devices of FIGS. 1 and 2.

The intensity of the light output which emerges from the polarizer 20 and is applied as an input to the photomultiplier 24 varies with the voltage applied to the crystal 10. This voltage input-light output characteristic of the light switch is shown in FIG. 3 wherein the light output from the polarizer 20 is plotted against the voltage applied across the crystal 10. As is there shown, the intensity of the light output increases with increasing voltage to a maximum point and then decreases back to zero and then goes through a similar though shorter cycle. These cycles are repeated for increasing voltages as is shown in the above cited copending application. In the bistable device of FIG. 1, the non-linear characteristic of the light switch is employed to advantage in combination with the characteristic of the photomultiplier 24 to provide a device which is capable of maintaining itself stably in either an on or an off condition. The device is turned on by operating a switch 30 against a terminal 32 to allow a battery 34 to apply a voltage to the electrode 12 on crystal 10. This voltage causes the polarization of the light then passing through the crystal to be changed so that it emerges from the crystal elliptically polarized. As a result, a portion of the light incident on polarizer 20 passes through this polarizer and is applied as a light input to photomultiplier 24. This photomultiplier is shown diagrammatically with its cathode connection being designated 36 and its anode connection being designated 38. A battery 40 serves as the source for the photomultiplier and a resistor 42 serves as a load. When there is no light incident on the photomultiplier, the current in this light responsive circuit, which includes battery 40, photomultiplier cathode 36, anode 38, and load resistor 42, is essentially zero. However, when a light input is applied to the photomultiplier, a current is produced in this circuit, the magnitude of which is dependent upon the intensity of the light input.

Figure 4:
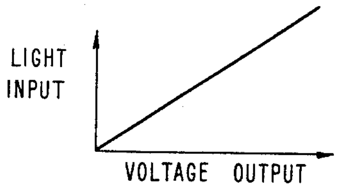
FIG. 4 shows the light input-voltage output characteristic for the light responsive circuit used in the devices of FIGS. 1 and 2.

The photomultiplier is of the type which produces a current which increases linearly as the intensity of the light input increases. The voltage drops across the load resistor 42 and, therefore, the voltage at a terminal 46 also increases linearly as the intensity of the light input to the photomultiplier 24 increases. The light input-voltage output characteristic of the device is plotted in FIG. 4, wherein the light input to the photomultiplier is plotted against the voltage developed at the terminal 46. The slope of this characteristic is dependent upon the photomultiplier itself and the value of the load resistor and these elements are chosen to produce a light input-voltage output characteristic such as is shown in this figure.

Figure 5:
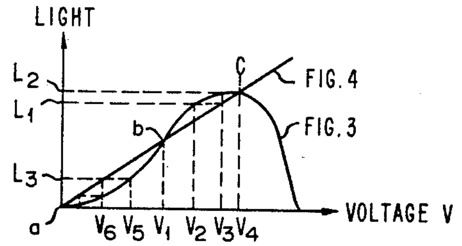
FIG. 5 is a composite showing the characteristics of FIGS. 3 and 4 plotted one on the other.

From the circuit of FIG. 1, it can be seen that the terminal 46 is also connected to the electrode 12 on crystal 10, at which electrode the initial input voltage is applied by the battery 34 under control of switch 30. Any voltage developed at terminal 46, whether as a result of closing switch 30 against terminal 32, or as a result of current flowing in the load resistor 42 when a light input is applied to photomultiplier 24, is applied as a voltage input to the crystal 10. Thus, the characteristic curves of FIGS. 3 and 4 may be plotted together as shown in FIG. 5. In this figure, the ordinate is plotted in terms of light intensity and the abscissa in terms of voltage. For the characteristic curve of the light switch, the light intensity L represents the output produced by the light switch and applied to the photomultiplier 24 in response to voltages V at terminal 46 which are applied to the crystal 10. For the characteristic of the photomultiplier circuit, the light intensity L represents the input to the photomultiplier and voltage V represents the voltage produced at the terminal 46 as the result of light input.

These two characteristic curves as shown in FIG. 5, intersect at three points which are designated "*a*," "*b*," and "*c*." The points "*a*" and "*c*" are the stable operating points of the bistable device in FIG. 1 and represent, respectively, the off and on conditions of this device. The point "*b*" defines the threshold for the device and corresponds to the voltage $V_1$. By this, it is meant that the voltage applied by battery 34 under control of switch 30 must exceed the voltage $V_1$ in order to turn the device from its off to its on condition so that it will remain on after the switch 30 is opened. If a voltage in magnitude less than $V_1$ is applied, the switch returns to its off condition when switch 30 is opened. This threshold is realized since the gain of the device, that is, the ratio of the voltage output produced at terminal 46 to the voltage applied to the crystal to produce this output, is less than one between points "*a*" and "*b*," and the gain of the device is greater than one between points "*b*" and "*c*." Thus, if the gain of the device is considered to be the ratio of the voltage output of the photomultiplier to the voltage input applied to the light switch to produce the output, the gain is less than one between points "*a*" and "*b*" and greater than one between points "*b*" and "*c*."

Consider first, the operation when switch 30 is closed against terminal 32 to allow the battery 34 to apply a voltage in magnitude equal to $V_2$ shown in FIG. 5 to terminal 46. This voltage is applied across the crystal 10 causing a light output, shown as $L_1$ in FIG. 5, to be developed by the light switch and applied as an input to the photomultiplier 24. This light input to the photomultiplier produces current in the photomultiplier circuit including the load resistor 42 sufficient to cause the voltage at terminal 46 to be raised to the value $V_3$. The switch 30 need only be maintained closed until the voltage at terminal 46 is raised to the voltage $V_2$ as a result of the photomultiplier current produced by the output of the light switch. The voltage $V_3$, when applied to the crystal 10, causes a further increase in the intensity of the output of the light switch. This increased output is applied as an input to photomultiplier 24, again increasing the current in the photomultiplier circuit and the voltage at terminal 46. This feed back operation continues until the device reaches the stable operation point "*c*" at which the voltage at the terminal 46 corresponds to the value $V_4$ shown in FIG. 5, and the light output of the light switch, which corresponds to the light input of the photomultiplier, is at the value shown $L_2$ in this figure.

When it is desired to turn the light switch from the on condition to the off condition, the switch 30 is closed against a terminal 50 to short circuit the load resistor 42 and decrease the voltage at terminal 46 to essentially zero. In this way, the voltage applied to the crystal 10 is also decreased to essentially zero so that light no longer passes through the polarizer 20 to the photomultiplier 24 and the feed back operation described above is terminated. When the switch 30 is opened to the condition shown in FIG. 1, the device remains in this off condition.

From the above description, it can be seen that the bistable switching device of FIG. 1 can be turned from its off to its on condition by closing switch 30 against teriminal 32 to allow battery 34 to apply a voltage at terminal 46 which is greater in magnitude than the value $V_1$ and less in magnitude than the value $V_4$. This voltage at terminal 46 is applied to crystal 10 and is effective to cause the light switch to produce a light output which is applied as an input to the photomultiplier 24. This light input to the photomultiplier produces current in the photomultiplier circuit sufficient to develop a voltage in excess of the voltage value $V_1$ at terminal 46 so that the device remains stably in an on condition after switch 30 is opened to the condition shown in FIG. 1. The bistable device is turned from its on to its off condition merely by operating the switch 30 against the terminal 50 to reduce the voltage at terminal 46 to essentially zero and, thereby interrupt the feed back operation. Once this has been accomplished, the switch may be returned to its initial condition and the device will remain in its off condition.

As was stated above, it is necessary in order to turn the switch from its off to its on condition that the voltage applied at terminal 46 exceed the value $V_1$ shown in FIG. 5. If the voltage is less than the value $V_1$, for example, is equal to a voltage $V_5$, as shown in this figure, the light switch produces a light output corresponding in intensity to the value $L_3$. This light output, when applied as a light input to the photomutiplier, causes the photomultiplier circuit to produce a voltage at terminal 46 which is equal to the value $V_6$ shown in FIG. 5. This operation continues with the voltage at the terminal 46 and the light output produced by the light switch decreasing until the stable off condition at point "*a*" is reached. From this it can be seen that, when the voltage at terminal 46 is lowered below the value $V_1$, the device automatically reverts to its off condition at point "*a*." Therefore, in order to turn the switch off it is not necessary to reduce the voltage at terminal 46 completely to zero, but only to reduce it below the value $V_1$.

FIG. 2 shows a light delay line built in accordance with the principles of applicant's invention. This delay line includes essentially the same light switching and electric circuit elements as are employed in the device of FIG. 1 and, for this reason, the same reference numerals are employed to identify the corresponding elements in both figures. The device of FIG. 2 differs from the device of FIG. 1 only in that the second polarizer 20 of the light switch is separated from the photomultiplier 24 by a light delay path. This path is in the form of a light-transmission line between a pair of reflecting surfaces 60 and 62 which are mounted at a proper angle to cause the light which emerges from polarizer 20 to be reflected back and forth a number of times before it is applied as an input to the photomultiplier 24. The circuit of FIG. 2 is operable as a light delay line which is capable of storing a number of circulating pulses, each of which might represent an information value. A pulse is introduced into the delay line by operating switch 30 against a terminal 32 to allow the battery 34 to raise the voltage at terminal 46. The switch 30 is then returned to its initial condition so that a voltage pulse of a predetermined duration is applied at terminal 46. As in the device of FIG. 1, this voltage pulse has a magnitude in excess of the value $V_1$ in FIG. 5. This voltage pulse at terminal 46 closes the light switch formed by the polarizers 18 and 20 and barium titanate crystal 10 so that a light pulse is passed through the polarizer 20 and is incident upon the reflecting surface 60. The duration of this light pulse is dependent upon the duration of the voltage pulse developed at terminal 46 under control of switch 30. This light pulse is reflected back and forth between the reflected surfaces 60 and 62 and eventually is applied as an input to the photomultiplier 24. The time which it takes for the light pulse emerging from polarizer 20 to reach the photomultiplier 24 is dependent upon the space between the reflected surfaces 60 and 62 and the number of reflections which these surfaces provide before the light pulse is applied as an input to the photomultiplier. When the light pulse does reach the photomultiplier 24, current is produced by the photomultiplier circuit including the load resistor 42 so that the voltage pulse is again developed at the terminal 46. This voltage pulse is applied to the crystal 10 causing the operation to be repeated so that the light pulse continuously circulates in the device until terminated by operating the switch 30 against the terminal 50 at a proper time in the cycle.

It is, of course, obvious that more than one pulse may be stored in the line. Thus, for example, after a first pulse is applied to terminal 46 by battery 34 under control of switch 30 to produce a light pulse which is reflected back and forth between the surfaces 60 and 62, this switch may be again operated to produce one or more successive pulses which are circulated in the same way in the device. The number of circulating pulses which the device is capable of handling at one time is determined by the distance that the light pulses travel from the crystal 10 to the photomultiplier 24, which is a function of the space between the surfaces 60 and 62, and the duration of the pulses themselves. The outputs for both the device of FIG. 1 and that of FIG. 2 are manifested at terminal 46. The device of FIG. 1 provides outputs in the form of a continuous voltage at terminal 46 and the device of FIG. 2 provides outputs in the form of one or more successive signals, at terminal 46. It should be noted that as long as the initial pulse applied at terminal 46 exceeds the value $V_1$ (FIG. 5), or a higher voltage value depending upon the losses in the light delay path, the pulses are built up in magnitude during each circulation until the stable condition at point "*c*" is reached. If the original pulse applied at terminal 46 is less than the value $V_1$, the pulse degenerates with each circulation until it is effectively extinguished.

While the invention has been particularly shown and described with reference to preferred embodiments thereof, it will be understood by those skilled in the art that various changes in form and details may be made therein without departing from the spirit and scope of the invention.

What is claimed is:

1. An electro-optical bistable device comprising a light source, a light switch including a light modulating element, light responsive means producing an output voltage, means for applying said voltage to said light modulating element, said light switch being interposed between said light source and said light responsive means, a voltage source, means for selectively coupling said voltage source across said element to operate said device in a first stable state and means for selectively reducing the voltage across said element to operate said device in a second stable state.

2. An electro-optical bistable device comprising a light source, a light switch including a barium titanate crystal maintained at its Curie temperature, light responsive means including a load impedance, means for coupling said load impedance to said barium titanate crystal, a voltage source, means for selectively coupling said voltage source across said impedance to operate said device in a first stable state and means for selectively reducing said load impedance to operate said device in a second stable state.

3. An electro-optical device comprising means responsive to a light signal having a substantially linear light input-voltage output characteristic, means coupled to said light signal responsive means, responsive to a first input voltage signal, for applying to said light signal responsive means a light input producing a first voltage output pulse having a width of a given time duration and having a magnitude greater than that of said voltage signal and responsive to a second input voltage signal for applying to said light signal responsive means a light input producing a second voltage output pulse having a magnitude less than that of said second input voltage and means for delaying signals flowing from the output to the input of said voltage signal responsive means for a time duration substantially greater than said given time duration.

4. An electro-optical device comprising a light source for producing a light beam, light responsive means producing a given voltage upon the reception of a given light input, means disposed in the path of said light beam and coupled to the output of said light responsive means for producing a light output of a given time duration having an intensity greater than the intensity of said given light input upon the application thereto of a voltage having a magnitude equal to that of said given voltage, said light output being applied to said light responsive means, and means interposed between the output and the input of said light output producing means for delaying signals flowing from the output to the input thereof for a time duration substantially greater than said given time duration.

5. An electro-optical device as set forth in claim 4 wherein said signal delaying means includes light delaying means interposed between said light producing means and said light responsive means.

6. An electro-optical device as set forth in claim 5 wherein said light delaying means comprises means including a pair of parallel spaced apart reflecting surfaces.

7. An electro-optical bistable device comprising a light source, light responsive means including a load impedance across which an output voltage is produced, first and second polarizers, each polarizer having an angle of acceptance disposed at right angles to the angle of acceptance of the other polarizer, a barium titanate crystal maintained at its Curie temperature interposed between said first and second polarizers, means for applying the voltage across said load impedance to said crystal, a voltage source, means for selectively coupling said voltage source across said impedance to operate said device in a first stable state and means for selectively reducing said load impedance to operate said device in a second stable state.

8. An electro-optical bistable device comprising a light source, light responsive means producing an output voltage and having a given light input-voltage output characteristic, a light switch including a light modulating element interposed between said source and said light responsive means, said light switch having a characteristic voltage input-light output characteristic such that when it is superimposed on said given characteristic at least two points of intersection are provided defining first and second stable operating states for said device, means for applying the output voltage of said light responsive means to said light modulating element, a voltage source, means for selectively coupling said voltage source to said element to operate said device in said first stable state and means for selectively varying the voltage applied to said element to operate said device in said second stable state.

References Cited in the file of this patent

UNITED STATES PATENTS

| | | |
|---|---|---|
| 1,894,636 | Scheibell | Jan. 17, 1933 |
| 2,064,289 | Cady | Dec. 15, 1936 |
| 2,909,973 | Koelsch et al. | Oct. 27, 1959 |
| 2,936,380 | Anderson | May 10, 1960 |